United States Patent [19]
Ogawa

[11] Patent Number: 5,321,448
[45] Date of Patent: Jun. 14, 1994

[54] LIQUID CRYSTAL PROJECTOR

[75] Inventor: Masahiro Ogawa, Akishima, Japan

[73] Assignee: Casio Computer Co., Ltd., Tokyo, Japan

[21] Appl. No.: 882,463

[22] Filed: May 12, 1992

[30] Foreign Application Priority Data

May 17, 1991 [JP] Japan ................. 3-113078

[51] Int. Cl.⁵ .............................. G03B 21/28
[52] U.S. Cl. .......................... 353/34; 353/31; 353/37
[58] Field of Search ............... 353/31, 34, 37, 33, 353/30, 20, 82, 122; 359/40, 41, 63, 64, 68, 37; 358/60, 231

[56] References Cited

U.S. PATENT DOCUMENTS

| | | | |
|---|---|---|---|
| 4,864,390 | 9/1989 | McKechnie et al. | 353/34 |
| 4,936,658 | 6/1990 | Tanaka et al. | 353/34 |
| 5,060,058 | 10/1991 | Goldenberg et al. | 359/41 |
| 5,105,265 | 4/1992 | Sato et al. | 353/34 |
| 5,142,387 | 8/1992 | Shikama et al. | 353/122 |

FOREIGN PATENT DOCUMENTS

2-83523 6/1990 Japan.
0041434 2/1991 Japan ................. 353/81

Primary Examiner—William A. Cuchlinski, Jr.
Assistant Examiner—William C. Dowling
Attorney, Agent, or Firm—Frishauf, Holtz, Goodman & Woodward

[57] ABSTRACT

A liquid crystal projector comprises a light source, two color-separating dichroic mirrors for separating light from the light source into lights of red, green and blue lights wavebands, three liquid crystal display elements for producing image lights of red, green and blue wavebands using those separated lights of different wavebands, two color-combining dichroic mirrors for combining the image lights of different wavebands to finally provide single image light, three luminous flux reduction lenses provided on an optical path running from the individual color-separating dichroic mirrors to the individual color-combining dichroic mirrors, and a projection lens for projecting the image light combined by the color-combining dichroic mirrors. The color-combining dichroic mirrors are designed in such a way to combine image lights with priority over the image light with an intermediate waveband.

8 Claims, 8 Drawing Sheets

LIQUID CRYSTAL PROJECTOR

BACKGROUND OF THE INVENTION

1. Field of the Invention

The present invention relates to a liquid crystal projector for projecting a full-color image on a projection surface, such as a screen, and, more particularly, to an apparatus which uses three liquid crystal display elements to display images of three primary colors, red, green and blue, respectively, combines the red, green and blue image lights from those liquid crystal display elements into one full-color image light and projects this light.

2. Description of the Related Art

Figure 1:
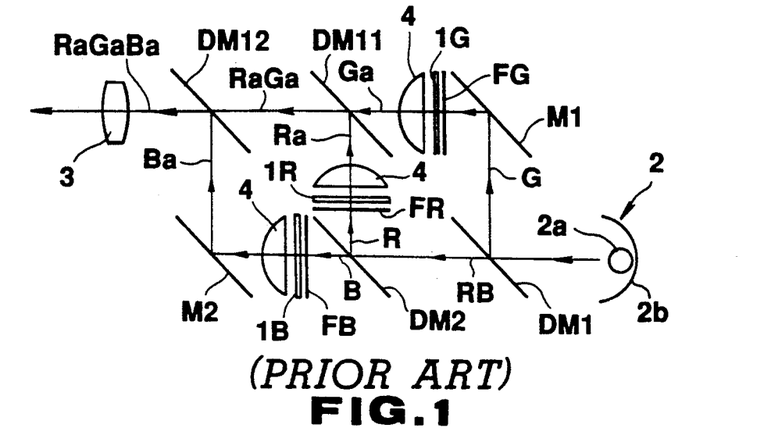
FIG. 1 is a diagram illustrating a conventional liquid crystal projector.

FIG. 1 illustrates the structure of a liquid crystal projector of this type.

This liquid crystal projector comprises three liquid crystal display elements 1R, 1G and 1B, a light source 2, two color-separating dichroic mirrors DM1 and DM2 for separating the light from the light source 2 into lights R, G and B of the three primary colors (red, green and blue), two color-combining dichroic mirrors DM11 and DM12, which constitute an optical system for combining image lights emanating from the three image display elements 1R, 1G and 1B, and a projection lens 3. Those components are arranged as illustrated in FIG. 1.

The liquid crystal display element 1R displays an image with a red component and will therefore be referred to as "red image display element." The liquid crystal display element 1G displays an image with a green component and will therefore be referred to as "green image display element." The liquid crystal display element 1B displays an image with a blue component and will therefore be referred to as "blue image display element."

The individual image display elements 1R, 1G and 1B are matrix liquid crystal display elements of the same structure. The red image display element 1R is driven for its display action in accordance with the red-component image data among image data with individual color components of red, green and blue that offer a full-color image. The green image display element 1G is driven for its display action in accordance with the green-component image data, and the blue image display element 1B is driven for its display action in accordance with the blue-component image data.

The light source 2 comprises a high-luminance lamp 2a for emanating white light, and a reflector 2b for reflecting the light from the lamp 2a toward the first color-separating dichroic mirror DM1. The reflector 2b is a parabolic reflector to reflect the light from the lamp 2a in the direction parallel to the reflector's optical axis.

The first color-separating dichroic mirror DM1 has a characteristic to reflect light of a green waveband among the white light from the light source 2 while passing light of the other wavebands. The green light G separated by this dichroic mirror DM1 is reflected at a mirror M1 to enter the green image display element 1G.

The second color-separating dichroic mirror DM2 has a characteristic to reflect light of a red waveband among the light RB which has passed first color-separating dichroic mirror DM1 and includes light of a red waveband and light of a blue waveband, and to pass the light of the blue waveband. The red light R separated by this dichroic mirror DM2 enters the red image display element 1R, while the blue light B enters the blue image display element 1B.

Color purity compensation filters FR, FG and FB are respectively arranged on the light-incident sides of the individual display elements 1R, 1G and 1B, so that the color purities of the red, green and blue lights R, G and B separated by the color-separating dichroic mirrors DM1 and DM2 are compensated for by those filters FR, FG and FB, respectively, before entering the respective display elements 1R, 1G and 1B.

Figure 2:
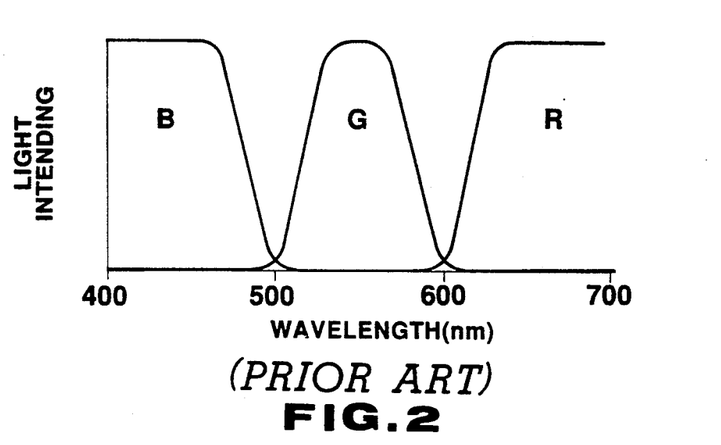
FIG. 2 is a diagram showing the wavebands of red, green and blue lights separated from the light from a light source by dichroic mirrors in the conventional liquid crystal projector.

FIG. 2 illustrates wavebands of the red, green and blue lights R, G and B separated by the color-separating dichroic mirrors DM1 and DM2; the wavebands of the red light R and the green light G lap over each other around 600 nm, and the wavebands of the green light G and the blue light B lap over each other around 500 nm.

Accordingly, of the red, green and blue lights R, G and B, the green light G of an intermediate waveband includes the red and blue components though slightly, while the red light R and blue light B slightly includes the green component. If the different-color components included in those lights R, G and B are cut off by the color purity compensation filters FR, FG and FB, lights R, G and B with high color purity can enter the respective display elements 1R, 1G and 1B.

The red light R entering the red image display element 1R becomes red image light Ra after passing therethrough, the green light G entering the green image display element 1G becomes green light G after passing therethrough, and the blue light B entering the blue image display element 1B becomes blue image light Ba after passing therethrough.

The red image light Ra leaving the red image display element 1R and the green image light Ga leaving the green image display element 1G enter the first color-combining dichroic mirror DM11, while the blue image light Ba leaving the blue image display element 1B is reflected at a mirror M2 to enter the second color-combining dichroic mirror DM12.

The first color-combining dichroic mirror DM11 has a characteristic to pass light of a green waveband and reflect light of the other wavebands. The green image light Ga passes through the dichroic mirror DM11 and the red image light Ra is reflected by that mirror DM11, so that both image lights Ga and Ra are combined to yield image light RaGa of a combined color of red and green, i.e., yellow.

The image light RaGa combined by the first color-combining dichroic mirror DM11 enters the second color-combining dichroic mirror DM12 to be combined with the blue image light Ba which also enters this dichroic mirror DM12.

The second color-combining dichroic mirror DM12 has a characteristic to pass light of red and green wavebands and reflect light of the other wavebands. The red-green combined image light RaGa passes through the dichroic mirror DM12 and the blue image light Ba is reflected by that mirror DM12, so that both image lights RaGa and Ba are combined to yield full-color image light RaGaBa having the three primary colors, red, green and blue, combined. This full-color image light RaGaBa enters a projection lens 3, which increases the luminous flux of the received light and projects the resultant image light on a projection surface, such as a screen (not shown).

The liquid crystal projector has luminous flux reduction lenses 4 disposed on the light-leaving sides or light-incident sides of the individual display elements 1R, 1G and 1B; the location is on the light-leaving side in FIG. 1.

Those luminous flux reduction lenses 4 serve to reduce the luminous fluxes of the image lights Ra, Ga and Ba from the display elements 1R, 1G and 1B. Since those luminous flux reduction lenses 4 can reduce the luminous flux of the full-color image light RaGaBa or the combination of the image lights Ra, Ga and Ba before this light RaGaBa enters the projection lens 3, the projection lens 3 can be constituted of relatively inexpensive lenses with smaller diameters, thus contributing the reduction of the manufacturing cost of the liquid crystal projector.

In general, the projection lens 3 is constituted of a combination of multiple high precision lenses, and each precision lens becomes more expensive with an increase in its diameter. A large-diameter projection lens therefore becomes very expensive. If the fullcolor image light RaGaBa is sent to the projection lens 3 without reducing its luminous flux, the projection lens 3 should have a large diameter, resulting in an inevitable increase in the manufacturing cost of the liquid crystal projector.

If the full-color image light RaGaBa is sent to the projection lens 3 after reducing its luminous flux, the projection lens 3 can have a smaller diameter, so that the projection lens 3 can be constituted of relatively inexpensive lenses of smaller diameters, thus ensuring significant reduction of the manufacturing cost of the liquid crystal projector.

As means of inputting full-color image light RaGaBa to the projection lens 3 after reducing its luminous flux, a luminous flux reduction lens may be arranged on the light-incident side of the projection lens 3. In this case, however, the luminous flux reduction lens needs to have a large luminous flux reduction ratio, and one still has to consider the deformation of the projected image due to the lens aberration of that luminous flux reduction lens.

In this respect, the above liquid crystal projector has the luminous flux reduction lens 4 located on the light-leaving side or light-incident side of each of the display elements 1R, 1G and 1B. This arrangement provides a long optical path from the luminous flux reduction lenses 4 to the projection lens 3, allowing each luminous flux reduction lens 4 to have a smaller luminous flux reduction ratio so that the lens aberration need not be concerned with.

As each luminous flux reduction lens 4 can be of an inexpensive type, such as a Fresnel lens, the total cost of the luminous flux reduction lenses 4 if provided for the respective display elements 1R, 1G and 1B becomes less.

In the above liquid crystal projector, the components, such as the display elements and dichroic mirrors, are arranged in such a way that the optical paths from the light source to the individual display elements 1R, 1G and 1B are equal to each other and the optical paths from the individual display elements 1R, 1G and 1B to the projection lens 3 are equal to each other. The luminous flux reduction lenses 4 provided for the respective display elements 1R, 1G and 1B can therefore be of the same type.

The liquid crystal projector having the luminous flux reduction lenses 4 on the light-leaving sides or light-incident sides of the display elements 1R, 1G and 1B still has a problem of producing irregular colors on a full-color image projected on the projection surface.

This is because that the characteristics of the color-combining dichroic mirrors DM11 and DM12 which combine the image lights Ra, Ga and Ba from the respective display elements 1R, 1G and 1B vary in accordance with the incident angle of incident light.

More specifically, a dichroic mirror is designed to show a predetermined spectral characteristic to light incident to the incident surface at an angle of 45°, so that it shows a spectral characteristic shifted on the low wavelength side or high wavelength side with respect to light incident at an angle larger or smaller than 45°. It is to be noted that the range of the shift of the spectral characteristic of a dichroic mirror to the shift of incident angle is generally ±1 to 3 nm to a shifted angle of 1°.

In the liquid crystal projector having the luminous flux reduction lenses 4 on the light-leaving sides or light-incident sides of the display elements 1R, 1G and 1B, since the lights leaving the display elements 1R, 1G and 1B enter the color-combining dichroic mirrors DM11 and DM12 after having their luminous fluxes reduced, the incident angle to the dichroic mirrors DM11 and DM12 is almost 45° in the center portion of each mirror and becomes larger than 45° as the incident point approaches one end from the mirror's center portion while becoming smaller than 45° in the direction toward the other end from the center portion.

Accordingly, the color-combining dichroic mirrors DM11 and DM12 show predetermined spectral characteristics to light incident to their center portions while showing spectral characteristics shifted on the low wavelength side or high wavelength side to light entering on either end.

For instance, the first color-combining dichroic mirror DM11 passes light of every wavelength of the green image light Ga and reflects light of every wavelength of the red image light Ra in the center portion, while cutting off part of either the green image light Ga or red image light Ra on both ends of the mirror.

That is, the spectral characteristic of the dichroic mirror DM11 shifts on the low wavelength side on one end of this mirror and shifts on the high wavelength side on the other end, so that with the spectral characteristic shifted on the low wavelength side, the green image light Ga which is light of a lower waveband than the red image light Ra has its high-wavelength side component cut by the dichroic mirror DM11. With the spectral characteristic shifted on the low wavelength side, likewise, the red image light Ra or light of a high waveband has its low-waveband side component cut by the dichroic mirror DM11. What is cut by the dichroic mirror DM11 is light of a waveband corresponding to the amount of shift of the spectral characteristic of the dichroic mirror.

The image light RaGa, the combined light of the green image light Ga having passed the dichroic mirror DM11 and the red image light Ra reflected by this mirror DM11, has a color with well-balanced red and green components in the center portion of the luminous flux, but shows a poor green component on the side corresponding to one side of the dichroic mirror DM11 while showing a poor red component on the side corresponding to the other side of the dichroic mirror DM11.

This is true of the second color-combining dichroic mirror DM12. Therefore, the full-color image light RaGaBa, the combined light of the image light RaGa having passed the dichroic mirror DM12 and the blue image light Ba reflected by this mirror DM12, has a color with well-balanced red, green and blue components in the center portion of the luminous flux, but shows a poorer green component on the side corresponding to one side of the dichroic mirror DM12 while showing a poor blue component on the side corresponding to the other side of the dichroic mirror DM12. The full-color image to be projected on the projection surface will inevitably have irregular color.

Figure 3:
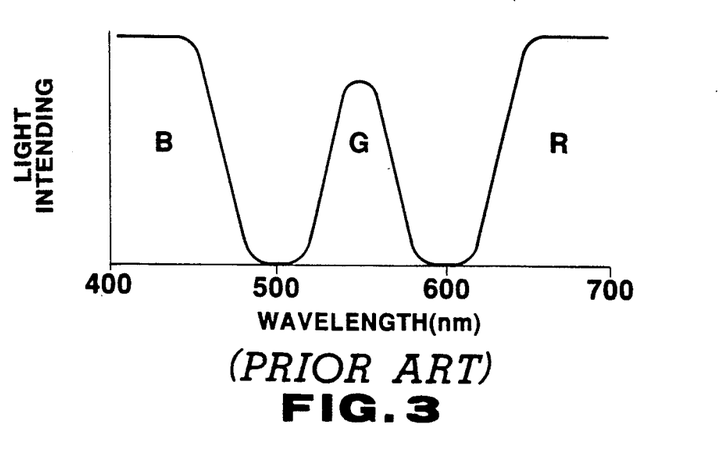
FIG. 3 is a diagram showing the wavebands of red, green and blue lights incident to respective display elements in the conventional liquid crystal projector.

Conventionally, therefore, the transmission wavebands of the color purity compensation filters FR, FG and FB located on the light-incident sides of the respective display elements 1R, 1G and 1B are narrowed to restrict the wavebands of the red, green and blue lights R, G and B to be incident to the display element 1R, 1G and 1B as shown in FIG. 3, thereby narrowing the wavebands of the red, green and blue image lights Ra, Ga and Ba which respectively leave the display elements 1R, 1G and 1B.

With the use of this design, even if the spectral characteristics of the color-combining dichroic mirrors DM11 and DM12 shift in accordance with the shift of the incident angle of light, the red, green and blue image lights Ra, Ga and Ba leaving the respective display elements 1R, 1G and 1B hardly include light of wavelengths which are cut by the dichroic mirrors DM11 and DM12. The light of every wavelength incident on either end of each of the dichroic mirrors DM11 and DM12 will therefore pass or will be reflected by the associated dichroic mirror, improving the color balance of the red, green and blue of the full-color image light RaGaBa combined by the dichroic mirrors DM11 and DM12 to ensure projection of a full-color image without color irregularity.

If the wavebands of the red, green and blue image lights Ra, Ga and Ba leaving the display elements 1R, 1G and 1B are narrowed in the above manner, however, the amount of each image light Ra, Ga or Ba will be reduced accordingly, thus darkening the full-color image to be projected on the projection surface.

SUMMARY OF THE INVENTION

It is therefore an object of the present invention to provide a liquid crystal projector which can yield combined color image light with well-balanced colors without narrowing the wavebands of image lights from individual display elements even with luminous flux reduction lenses arranged on the light-incident sides or light-leaving sides of the display elements, thus permitting projection of high-quality color image light with high brightness and free of color irregularity.

To achieve this object, according to one aspect of the present invention, there is provided a liquid crystal projector comprising:

a light source;

light separating means for separating light from the light source into lights of different wavebands;

a plurality of liquid crystal display elements for producing image lights of different wavebands using the separated lights of different wavebands;

light combining means provided with a plurality of dichroic mirrors for combining the image lights of different wavebands with priority on that image light of an intermediate waveband to finally provide single image light;

a luminous flux reduction lens provided on an optical path running from the light separating means to the light combining means; and projecting means for projecting the image light combined by the light combining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A first embodiment of the present invention will now be described referring to FIGS. 4 through 11.

Figure 4:
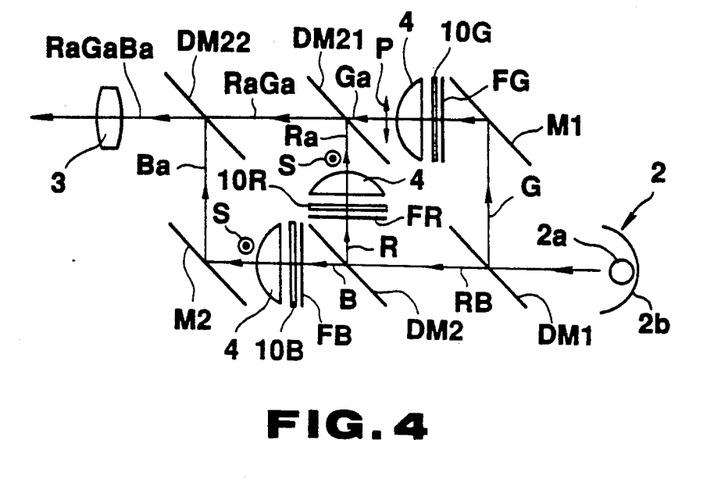
FIG. 4 is a diagram illustrating a liquid crystal projector according to a first embodiment.

FIG. 4 illustrates the structure of a liquid crystal projector according to this embodiment.

This liquid crystal projector comprises three liquid crystal display elements 10R, 10G and 10B, a light source 2, two color-separating dichroic mirrors DM1 and DM2 for separating the light from the light source 2 into red, green and blue lights R, G and B, two color-combining dichroic mirrors DM21 and DM22, which constitute an optical system for combining image lights emanating from the three image display elements 10R, 10G and 10B, and a projection lens 3. Those components are arranged as illustrated in FIG. 4. The components, such as the display elements and dichroic mirrors, are arranged in such a way that the optical paths from the light source to the individual display elements 10R, 10G and 10B are equal to each other and the optical paths from the individual display elements 10R, 10G and 10B to the projection lens 3 are equal to each other.

The light source 2 and the color-separating dichroic mirrors DM1 and DM2 are identical to those shown in FIG. 1, so that the green light G reflected and separated by the first color-separating dichroic mirror DM1 is reflected at a mirror M1 to enter the display element 10G for displaying a green image (hereinafter referred to as "green image display element"). The light RB of red and blue wavebands which has passed through the first color-separating dichroic mirror DM1 is separated into red light R and blue light B by the second color-separating dichroic mirror DM2, the red light R entering the display element 10R for display a red image (hereinafter referred to as "red image display element") and the blue light B entering the display element 10B for displaying a blue image (hereinafter referred to as "blue image display element").

As shown in FIG. 2, the wavebands of the red light R and the green light G separated by the color-separating dichroic mirrors DM1 and DM2 lap over each other around 600 nm, and the wavebands of the green light G and the blue light B lap over each other around 500 nm. In the liquid crystal projector of this embodiment, color purity compensation filters FR, FG and FB are also arranged on the light-incident sides of the respective display elements 10R, 10G and 10B so that lights R, G and B with high color purity can enter the respective display elements 10R, 10G and 10B.

To allow the projection lens 3 to be constituted of relatively inexpensive lenses with smaller diameters, luminous flux reduction lenses 4 for reducing the luminous fluxes of the lights from the display elements 10R, 10G and 10B are disposed on the light-leaving sides (in the illustrated case) or light-incident sides of the display elements 10R, 10G and 10B.

The individual image display elements 10R, 10G and 10B are matrix liquid crystal display elements of the same structure. The red image display element 10R where the red light R enters is driven for its display action in accordance with the red-component image data among image data with individual color components of red, green and blue that offer a full-color image. The green image display element 10G where the green light G enters is driven for its display action in accordance with the green component image data. The blue image display element 10B where the blue light B enters is driven for its display action in accordance with the blue-component image data.

According to this embodiment, like in the liquid crystal projector shown in FIG. 2, first the red image light Ra leaving the red image display element 10R and the green image light Ga leaving the green image display element 10G are combined into image light RaGa by the first color-combining dichroic mirror DM21, then the combined image light RaGa and the blue image light Ba from the blue image display element 10B are combined into single full-color image light RaGaBa by the second color-combining dichroic mirror DM22, and the full-color image light RaGaBa is projected enlarged on a projection surface such as screen (not shown) by the projection lens 3.

The red image light Ra from the red image display element 10R and the green image light Ga from the green image display element 10G enter the first color-combining dichroic mirror DM21, while the blue image light Ba from the blue image display element 10B is reflected at a mirror M2 to enter the second color-combining dichroic mirror DM22.

The color combining dichroic mirrors DM21 and DM22 are the same as the first and second color-combining dichroic mirrors DM11 and DM12 used in the liquid crystal projector shown in FIG. 2.

The first color-combining dichroic mirror DM21 has a characteristic to pass light of a green waveband and reflect light of the other wavebands. The green image light Ga passes through the dichroic mirror DM21 and the red image light Ra is reflected by that mirror DM21, so that both image lights Ga and Ra are combined to yield image light RaGa of a combined color (yellow) of red and green.

The image light RaGa combined by the first color-combining dichroic mirror DM21 enters the second color-combining dichroic mirror DM22 to be combined with the blue image light Ba.

The second color-combining dichroic mirror DM22 has a characteristic to pass light of red and green wavebands and reflect light of the other wavebands. The red-green combined image light RaGa passes through the dichroic mirror DM22 and the blue image light Ba is reflected by that mirror DM22, so that both image lights RaGa and Ba are combined to yield full-color image light RaGaBa having the three primary colors, red, green and blue, combined.

In this embodiment, the light from the green image display element 10G among the three display elements 10R, 10G and 10B is made to be P polarized light to the first and second color-combining dichroic mirrors DM21 and DM22, and the lights from the red and blue image display elements 10G and 10B ar made to be S polarized light to those color-combining dichroic mirrors DM21 and DM22.

Figure 5:
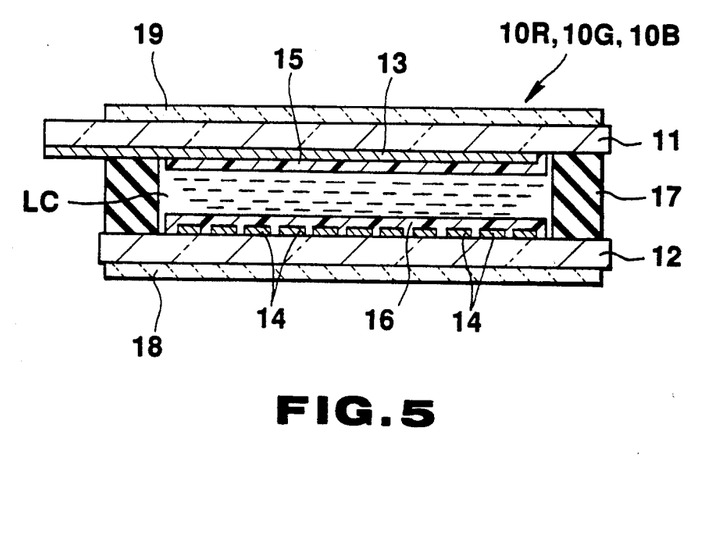
FIG. 5 is a cross sectional view of a display element.

FIG. 5 presents a cross-sectional view showing the structure of each display element 10R, 10G or 10B. In this display element, a transparent substrate 11, which has many scan electrodes 13 formed thereon with an alignment film 15 further formed thereon, is connected to a transparent substrate 12, which has many signal electrodes 14 formed thereon with an alignment film 16 further formed thereon, by means of a frame-shaped seal member 17, with liquid crystals LC sealed between both substrates 11 and 12. The display element further has a light-incident side polarizing plate 18 and a light-leaving side polarizing plate 19 respectively provided on the light incident side and light-leaving side. Although the display element shown in FIG. 5 is a simple matrix type liquid crystal display element, the display elements 10R, 10G and 10B may be of an active matrix type.

The transmission axis of the light-leaving polarizing plate 19 of the green image display element 10G extends in the direction to be P-polarization to the first and second color-combining dichroic mirrors DM21 and DM22, so that the green image light Ga leaving the green image display element 10G becomes P-polarized light to those dichroic mirrors DM21 and DM22.

The transmission axes of the light-leaving polarizing plates 19 of both red and blue image display elements 10R and 10B extend in the direction to be S-polarization to the first and second color-combining dichroic mirrors DM21 and DM22, so that the red and blue image lights Ra and Ba leaving the red and blue image display elements 10R and 10B become S-polarized light to those dichroic mirrors DM21 and DM22.

Referring to FIG. 4, p indicates the polarizing direction of the P-polarization, and s indicates the polarizing direction of the S-polarization. In other words, P-polarized light is perpendicular to the axes of the light incident to the dichroic mirrors DM21 and DM22 and parallel to the sheet of FIG. 4, and S-polarized light is perpendicular to the axes of the light incident to the dichroic mirrors DM21 and DM22 and normal to the sheet of FIG. 4.

The reasons why the green image light Ga is made to enter as P-polarized light to the first and second color-combining dichroic mirrors DM21 and DM22, and the red and blue image lights Ra and Ba are made to enter as S-polarized light to the color-combining dichroic mirrors DM21 and DM22 are to provide the first color-combining dichroic mirror DM21 with a wider transmission waveband to the green image light Ga and a wider reflection waveband to the image light of one of the other colors (red image light Ra in this embodiment) and provide the second color-combining dichroic mirror DM22 with a wider transmission waveband to the green image light Ga and a wider reflection waveband to the image light of one of the other colors (blue image light Ba in this embodiment).

Figure 6:
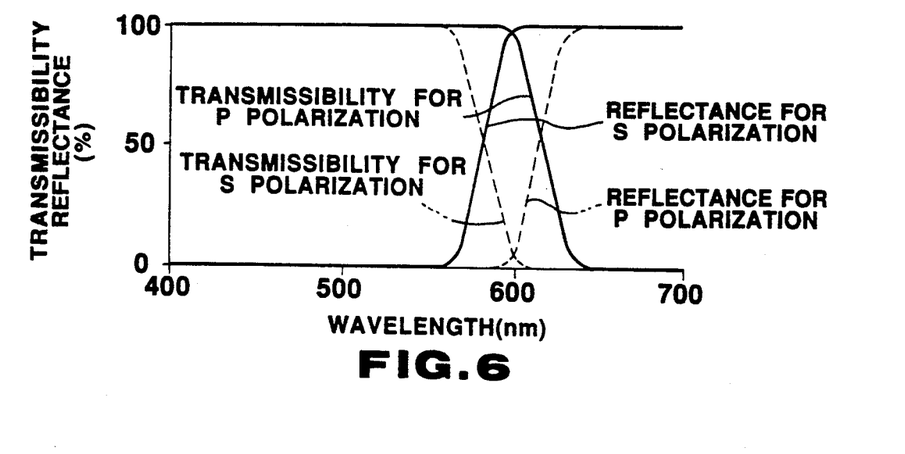
FIG. 6 is a diagram showing the spectral characteristic of a first color-combining dichroic mirror of the liquid crystal projector according to the first embodiment.
Figure 7:
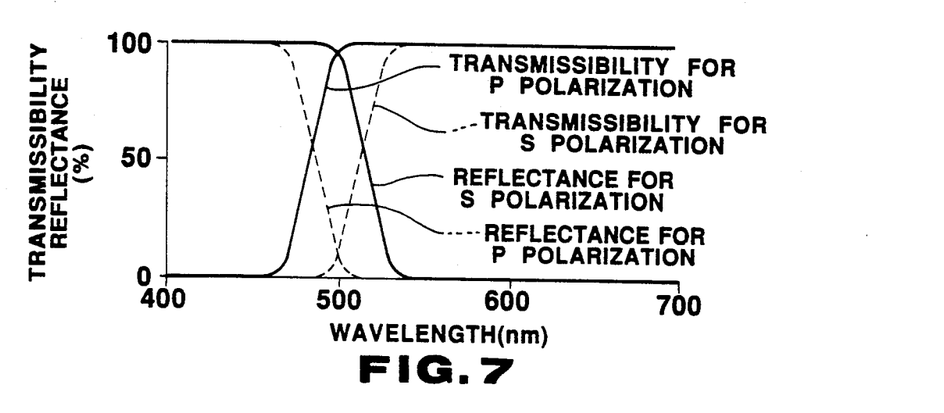
FIG. 7 is a diagram showing the spectral characteristic of a second color-combining dichroic mirror of the liquid crystal projector according to the first embodiment.

FIGS. 6 and 7 respectively illustrate the spectral characteristics of the first and second color-combining dichroic mirrors DM21 and DM 22 used in this embodiment. It is apparent from FIG. 6 that the first color-combining dichroic mirror DM21 has such a characteristic as to pass light of a wavelength lower than the boundary wavelength (around 600 nm) between the waveband of green light and that of red light and reflect light of a wavelength higher than this boundary wavelength. It is apparent from FIG. 7 that the second color-combining dichroic mirror DM22 has such a characteristic as to pass light of a wavelength higher than the boundary wavelength (around 500 nm) between the waveband of green light and that of blue light and reflect light of a wavelength lower than this boundary wavelength.

Since a dichroic mirror shows different spectral characteristics for different directions of polarization of incident light, the transmission waveband and reflection waveband of this dichroic mirror differ according to the direction of polarization of incident light. That is, the dichroic mirror has a wider transmission waveband to P-polarization than to S-polarization, and a wider reflection waveband to S-polarization than to P-polarization.

The above is true of the first and second color-combining dichroic mirrors DM21 and DM22, so that the dichroic mirrors DM21 and DM22 have a wider transmission waveband to P-polarization (solid line) than that to S-polarization (broken line), and a wider reflection waveband to S-polarization (solid line) than that to P-polarization (broken line).

It is to be noted that the difference between the transmission waveband of a dichroic mirror to P-polarization and that to S-polarization and the difference between the reflection waveband of the dichroic mirror to P-polarization and that to S-polarization are relatively large values of 10 nm to 35 nm.

If light to pass through the dichroic mirrors DM21 and DM22 is made to enter those dichroic mirrors as P-polarized light, and light to be reflected by the dichroic mirrors DM21 and DM22 is made to be incident thereto, the dichroic mirrors DM21 and DM22 can have wider transmission waveband and reflection waveband to the waveband of incident light.

In the above-described liquid crystal projector having luminous flux reduction lenses 4 arranged on the light-leaving sides or light-incident sides of the individual display elements 10R, 10G and 10B to allow the projection lens 3 to have a smaller diameter, as described earlier, the lights having left the display elements 10R, 10G and 10B enter the color-combining dichroic mirrors DM21 and DM22 while each reducing the luminous flux. The incident angles of lights to the dichroic mirrors DM21 and DM22 will therefore shift from the proper incident angle of 45° as the point of light incident approaches to either end of each mirror from the mirror's center, causing the spectral characteristics of the dichroic mirrors DM21 and DM22 to shift in accordance with a shift of the incident angle of light.

If the color-combining dichroic mirrors DM21 and DM22 are provided with wider transmission waveband and reflection waveband as mentioned above, the waveband of incident light will not be shifted off the transmission waveband or reflection waveband of those dichroic mirrors DM21 and DM22 even when the spectral characteristics thereof shift in accordance with a shifted incident angle. Therefore, light of every wavelength of image light incident to the dichroic mirrors DM21 and DM22 can pass therethrough or can be reflected thereat without being partially cut by those dichroic mirrors DM21 and DM22.

What should be concerned in combining the red, green and blue lights R, G and B when the spectral characteristics of the color-combining dichroic mirrors DM21 and DM22 shift is the combination of the green light G of an intermediate waveband with the red light R or blue light B whose waveband adjoins that of the green light G.

In the above embodiment, therefore, the first color-combining dichroic mirror DM21 for combining the green image light Ga and the red image light Ra has a characteristic to pass the green image light Ga and reflect the other image lights, the second color-combining dichroic mirror DM22 for combining the image light RaGa originating from the combination of the green and red image lights by the first color-combining dichroic mirror DM21 and the other one, the blue image light Ba, has a characteristic to pass the image light RaGa (red and green combined light) and reflect the blue image light Ba, and the green image light Ga is permitted to be incident as P-polarized light to the first and second color-combining dichroic mirrors DM21 and DM22 while the red image light Ra and blue image light Ba are made to be incident as S-polarized light to those dichroic mirrors DM21 and DM22.

This design can provide the first color-combining dichroic mirror DM21 with a wider transmission waveband to the green image light Ga and a wider reflection waveband to the image light of one of the other colors (red image light Ra in this embodiment), and provide the second color-combining dichroic mirror DM22 with a wider transmission waveband to the green image light Ga and a wider reflection waveband to the blue image light Ba. Even with the luminous flux reduction lenses 4 arranged on the light-incident sides or light-leaving sides of the display elements 10R, 10G and 10B, therefore, it is possible to allow light of every wavelength of the image lights Ra, Ga and Ba incident to the first and second color-combining dichroic mirrors DM21 and DM22 to pass therethrough or be reflected thereat without narrowing the wavebands of image lights from individual display elements as done in the prior art, thereby providing full-color image light RaGaBa with well-balanced colors.

Figure 8:
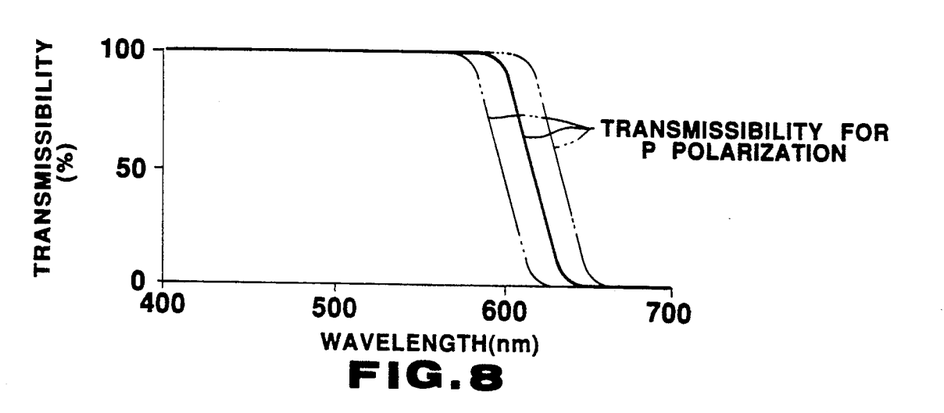
FIG. 8 is a diagram showing the transmission characteristic of the first color-combining dichroic mirror of the liquid crystal projector according to the first embodiment with respect to green image light.
Figure 9:
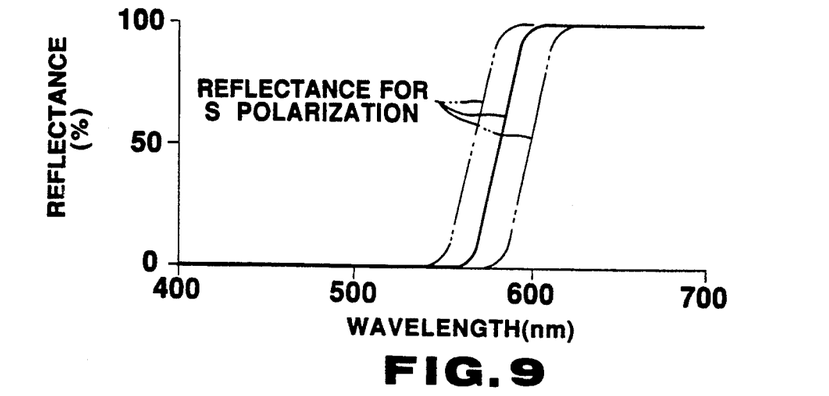
FIG. 9 is a diagram showing the reflection characteristic of the first color-combining dichroic mirror of the liquid crystal projector according to the first embodiment with respect to red image light.

FIG. 8 shows the transmission characteristics of the first color-combining dichroic mirror DM21 to P-polarization, and FIG. 9 the reflection characteristics of the first color-combining dichroic mirror DM21 to S-polarization. In each diagram, the solid line indicates the characteristic to light incident to the center of the associated dichroic mirror at an incident angle of 45°, while the chain lines indicate the characteristics to lights incident to both end portions of the dichroic mirror at shifted incident angles.

It is apparent from FIGS. 8 and 9 that the first color-combining dichroic mirror DM21 shows a transmission characteristic having the transmission waveband extending over the boundary wavelength (around 600 nm) of the waveband of green light and that of red light to the higher wavelength side with respect to P-polarization, while showing a reflection characteristic having the reflection waveband extending over this boundary wavelength to the lower wavelength side with respect to S-polarization. By causing the green image light Ga and the red image light Ra to be incident respectively as P-polarized light and S-polarized light to the dichroic mirror DM21, therefore, light of every wavelength of the green image light Ga can pass the dichroic mirror DM21 or light of every wavelength of the red image light Ra can be reflected at the dichroic mirror DM21 even when the spectral characteristic of the dichroic mirror DM21 shifts as indicated by the chain lines in accordance with shifted incident angles.

Figure 10:
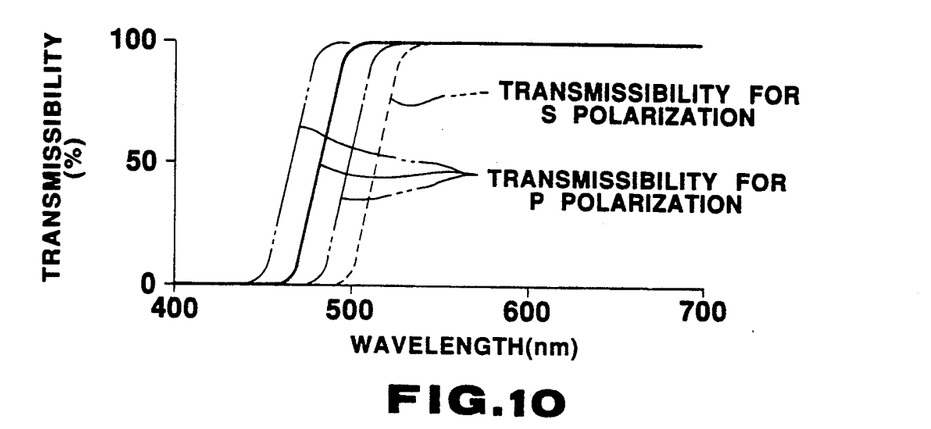
FIG. 10 is a diagram showing the transmission characteristic of the second color-combining dichroic mirror of the liquid crystal projector according to the first embodiment with respect to green image light.
Figure 11:
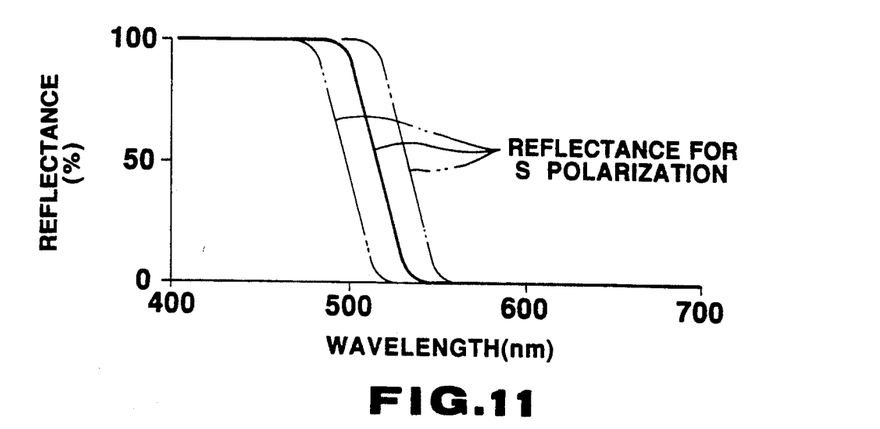
FIG. 11 is a diagram showing the reflection characteristic of the second color-combining dichroic mirror of the liquid crystal projector according to the first embodiment with respect to blue image light.

FIG. 10 shows the transmission characteristics of the second color-combining dichroic mirror DM22 to P-polarization, and FIG. 11 the reflection characteristics of the second color-combining dichroic mirror DM22 to S-polarization. In each diagram, the solid line indicates the characteristic to light incident to the center of the associated dichroic mirror at an incident angle of 45°, while the chain lines indicate the characteristics to lights incident to both end portions of the dichroic mirror at shifted incident angles.

It is apparent from FIGS. 10 and 11 that the second color-combining dichroic mirror DM22 shows a transmission characteristic having the transmission waveband extending over the boundary wavelength (around 500 nm) of the waveband of green light and that of blue light to the lower wavelength side with respect to P-polarization, while showing a reflection characteristic having the reflection waveband extending over this boundary wavelength to the higher wavelength side with respect to S-polarization. By causing the green image light Ga and the blue image light Ba to be incident respectively as P-polarized light and S-polarized light to the dichroic mirror DM22, therefore, light of every wavelength of the green image light Ga can pass the dichroic mirror DM22 or light of every wavelength of the blue image light Ba can be reflected at the dichroic mirror DM21 even when the spectral characteristic of the dichroic mirror DM22 shifts as indicated by the chain lines in accordance with shifted incident angles.

Although the red image light Ra combined with the green image light Ga by the first color-combining dichroic mirror DM21 is S-polarized light, since the waveband of this red image light Ra is separated from that of the blue image light Ba by the waveband of the green light, the red image light Ra combined with the green image light Ga by the first color-combining dichroic mirror DM21 can pass through the second dichroic mirror DM22 irrespective of the shifting of the spectral characteristic of the dichroic mirror DM22. In other words, since the second color-combining dichroic mirror DM22 passes light of a wavelength higher than the boundary wavelength (around 500 nm) of the waveband of green light and that of blue light and has narrower transmission waveband to S-polarization than to P-polarization but has a transmission characteristic to S-polarization as indicated by the broken line in FIG. 10, even if the red image light Ra is S-polarized light, this red image light Ra can pass the second color-combining dichroic mirror DM22 with a sufficient margin.

According to the liquid crystal projector of this embodiment, as described above, even if the spectral characteristics of the first and second dichroic mirrors DM21 and DM22 shift due to the shifting of the incident angle of light, every wavelength of the image lights Ra, Ga and Ba can pass the first and second color-combining dichroic mirrors DM21 and DM22 or can be reflected thereat, thereby providing full-color image light RaGaBa with well-balanced colors, and, unlike in the prior art, it is unnecessary to narrow the wavebands of image lights from individual display elements. It is therefore possible to widen the transmission wavebands of the color purity compensation filters FR, FG and FB located on the light-incident sides of the individual display elements 10R, 10G and 10B to increase the amount of light incident to each display element 10R, 10G or 10B, thus permitting projection of high-quality color image light with high brightness and free of color irregularity.

Although the green image light Ga and the red image light Ra are combined first to yield image light RaGa and then this image light RaGa is combined with the blue image light Ba to provide full-color image light RaGaBa in this embodiment, the order of combining the image lights is not restricted to this particular order. For instance, the green image light and blue image light may be combined first and the resultant image light may then be combined with the red image light. In this case, the location of the red image display element 10R should be changed with that of the blue image display element 10B, the spectral characteristic of the second color-separating dichroic mirror DM2 should be reversed, the green image light and blue image light need to be combined by the dichroic mirror having the spectral characteristic shown in FIG. 7 and the resultant combined image light needs to be combined with the red image light by the dichroic mirror having the spectral characteristic shown in FIG. 6.

A second embodiment will now be described referring to FIGS. 12 to 14.

Figure 12:
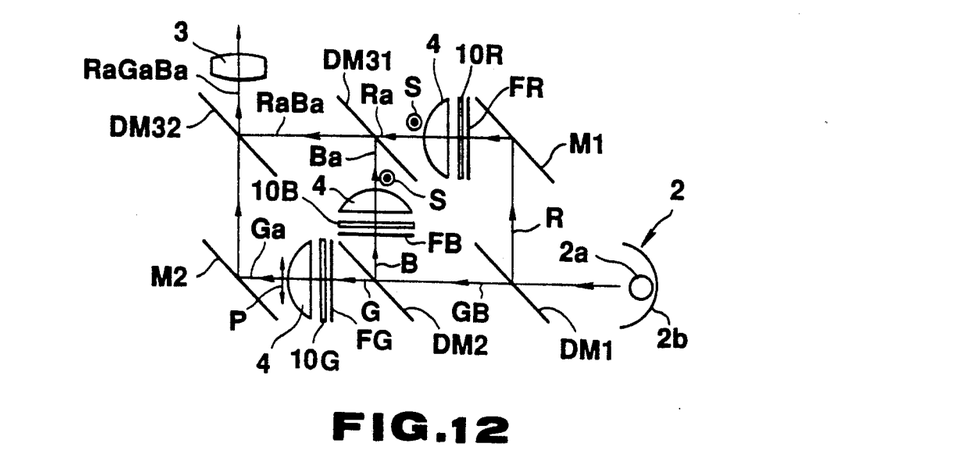
FIG. 12 is a view illustrating a liquid crystal projector according to a second embodiment.

A liquid crystal projector according to this embodiment is designed to have individual display elements 10R, 10G and 10B and first and second color-combining dichroic mirrors DM31 and DM32 arranged as shown in FIG. 12, so that, first, red image light Ra and blue image light Ba are combined by the first color-combining dichroic mirror DM31 to yield magenta image light RaBa and this image light RaBa is then combined with green image light Ga by the second color-combining dichroic mirror DM32 to yield full-color image light RaGaBa.

Components in FIG. 12 which correspond or are identical to those shown in FIG. 4 are denoted by like or same reference numerals to avoid their repetitive description. It is to be noted that the spectral characteristics of the color-separating dichroic mirrors DM1 and DM2 for separating the light from the light source 2 into red, green and blue lights R, G and B differ from those of the color-separating dichroic mirrors DM1 and DM2 shown in FIG. 4; in this embodiment, the first color-separating dichroic mirror DM1 has a characteristic to reflect light of a red waveband contained in the white light from the light source 2 and pass lights of the other wavebands, while the second color-separating dichroic mirror DM2 has a characteristic to reflect light of a blue waveband contained in light GB of the green and blue wavebands, which has passed the dichroic mirror DM1 and pass light of the green waveband.

The first color-combining dichroic mirror DM31 is given a characteristic to pass red image light Ra from the red image display element 10R and reflect blue image light Ba from the blue image display element 10B.

Figure 13:
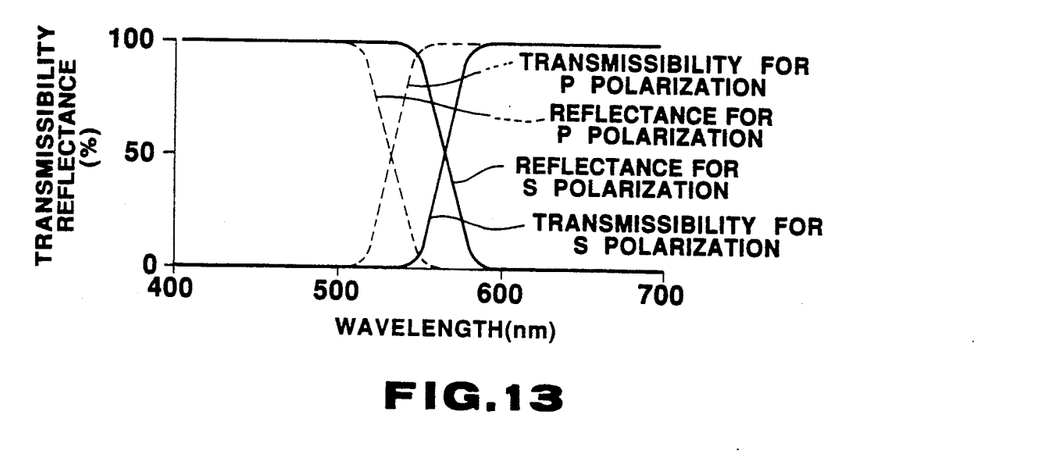
FIG. 13 is a diagram showing the spectral characteristic of a first color-combining dichroic mirror of the liquid crystal projector according to the second embodiment.

FIG. 13 illustrates the spectral characteristic of the first dichroic mirror DM31. It is apparent from this diagram that the dichroic mirror DM31 has a characteristic to pass light of a wavelength higher than an arbitrary reference wavelength in the waveband of green light (about 500 nm to about 600 nm) and reflect light of a wavelength lower than this reference wavelength.

The second color-combining dichroic mirror DM32 is given a characteristic to pass green image light Ga and reflect image light RaBa originating from the combination of red and blue lights.

Figure 14:
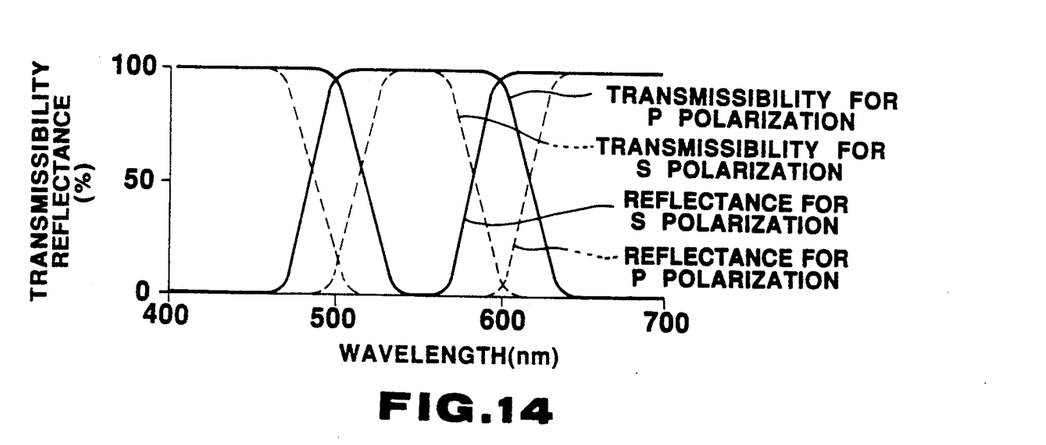
FIG. 14 is a diagram showing the spectral characteristic of a second color-combining dichroic mirror of the liquid crystal projector according to the second embodiment.

FIG. 14 illustrates the spectral characteristic of the second dichroic mirror DM32. It is apparent from this diagram that the dichroic mirror DM32 has a characteristic to pass light of a wavelength in the waveband of green light, and reflect light of a wavelength lower than the boundary wavelength (around 600 nm) of the wavebands of green and red lights and a light of a wavelength higher than the boundary wavelength (around 500 nm) of the wavebands of green and blue lights.

The individual display elements 10R, 10G and 10B are matrix type liquid crystal display elements having the structure shown in FIG. 5. The transmission axis of the light-leaving polarizing plate 19 of the green image display element 10G extends in the direction to be P-polarization to the second color-combining dichroic mirror DM32 and the transmission axes of the light-leaving polarizing plates 19 of the red and blue image display elements 10R and 10B extend in the direction to be S-polarization to the first and second color-combining dichroic mirrors DM31 and DM32.

In the liquid crystal projector of this embodiment too, the second color-combining dichroic mirror DM32 for combining the green image light Ga which has an intermediate waveband with the red image light Ra and blue image light Ba whose wavebands adjoin the waveband of the green image light Ga is given a characteristic to pass the green image light Ga and reflect the combined image light RaBa acquired from the first color-combining dichroic mirror DM31, and the green image light Ga is made to be P-polarized light to the second color-combining dichroic mirror DM32 while the red image light Ra and blue image light Ba are made to be S-polarized lights to this dichroic mirror DM32. Like in the first embodiment, therefore, it is possible to allow light of every wavelength of the image lights Ra, Ga and Ba incident to the color-combining dichroic mirrors DM31 and DM32 to pass therethrough or be reflected thereat without narrowing the wavebands of image lights from individual display elements 10R, 10G and 10B, thereby providing full-color image light RaGaBa with well-balanced colors.

The liquid crystal projector of the second embodiment also utilizes the fact that the spectral characteristic of a dichroic mirror varies with a change in the direction of polarization of incident light; the second color-combining dichroic mirror DM32 has such a characteristic as to have a wider transmission waveband to P-polarization than to S-polarization and a wider reflection waveband to S-polarization than to P-polarization as shown in FIG. 14.

If the green image light Ga to pass the second color-combining dichroic mirror DM32 and the red and blue image lights Ra and Ba to be reflected at the dichroic mirror DM32 are made to be incident respectively as P-polarized light and S-polarized light to the dichroic mirror DM32, therefore, light of every wavelength of the red, green and blue image lights Ra, Ga and Ba can pass through or can be reflected at the dichroic mirror DM32 even when the spectral characteristic of the dichroic mirror DM32 shifts in accordance with shifted incident angles.

Although the red image light Ra and blue image light Ba, which are combined by the first color-combining dichroic mirror DM31, are S-polarized lights, since the waveband of this red image light Ra is separated from that of the blue image light Ba by the waveband of the green light, light of every wavelength of the red image light Ra and blue image light Ba incident to the first color-combining dichroic mirror DM31 can pass through or can be reflected at the dichroic mirror DM31 irrespective of the shifting of the spectral characteristic of the dichroic mirror DM31 due to a change in the direction of polarization of incident light, if the dichroic mirror DM31 is given such a characteristic as to pass light of a wavelength higher than an arbitrary reference wavelength in the waveband of green light and reflect light of a wavelength lower than this reference wavelength as shown in FIG. 13.

In the liquid crystal projector of this embodiment, therefore, it is also possible to widen the transmission wavebands of the color purity compensation filters FR, FG and FB located on the light-incident sides of the individual display elements 10R, 10G and 10B to increase the amount of light incident to each display element, thus permitting projection of high-quality color image light with high brightness and free of color irregularity.

In the above embodiment, the location of the red image display element 10R may be changed with the location of the blue image display element 10B. In this case, the spectral characteristics of the first and second color-separating dichroic mirrors DM1 and DM2 should be selected in accordance with the arrangement of the individual display elements 10R, 10G and 10B, and the first color-combining dichroic mirror DM31 should have a spectral characteristic to pass the red image light Ra and reflect the blue image light Ba. In this case too, the second color-combining dichroic mirror DM32 can have the same characteristic as that in the above embodiment.

A third embodiment will now be described referring to FIGS. 15 through 17.

Figure 15:
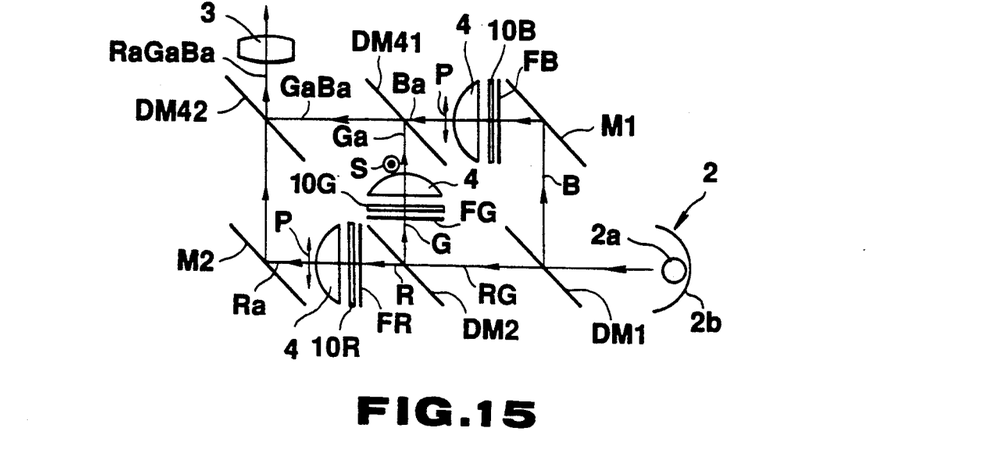
FIG. 15 is a view illustrating a liquid crystal projector according to a third embodiment.

FIG. 15 illustrates structure of a liquid crystal projector according to this embodiment. The liquid crystal projector is designed in such a way that an optical system for combining red, green and blue image lights Ra, Ga and Ba comprises a first color-combining dichroic mirror DM41 for combining the green image light Ga from the green image display element 10G with image light from one of the other display elements (blue image light Ba in this embodiment) to yield image light GaBa and a second color-combining dichroic mirror DM42 for combining the image light GaBa containing a green component with image light from the other display element (red image light Ra in this embodiment), as in the first embodiment.

Components in FIG. 15 which correspond or are identical to those shown in FIG. 4 are denoted by like or same reference numerals and their description will not be given below. It is to be noted that the red image display element 10R and the blue image display element 10B are arranged opposite to those in FIG. 4, so that, of the color-separating dichroic mirrors DM1 and DM2 for separating the light from the light source 2 into red, green and blue lights R, G and B, the first color-separating dichroic mirror DM1 has a characteristic to reflect light of a blue waveband contained in the white light from the light source 2 and pass lights of the other wavebands, while the second color-separating dichroic mirror DM2 has a characteristic to reflect light of a green waveband contained in light RG of the green and blue wavebands, which has passed the dichroic mirror DM1 and pass light of the red waveband.

In this embodiment, the first color-combining dichroic mirror DM41 is given a characteristic to reflect the green image light Ga and pass the blue image light Ra while the second color-combining dichroic mirror DM42 is given a characteristic to reflect the cyan image light RaGa containing a green component, which is acquired by the first color-combining dichroic mirror DM41, and pass the red image light Ra, and the transmission axis of the light-leaving polarizing plate 19 of the green image display element 10G extends in the direction to be S-polarization to the first and second color-combining dichroic mirrors DM41 and DM42 while the transmission axes of the light-leaving polarizing plates 19 of the red and blue image display elements 10R and 10B extend in the direction to be P-polarization to the second color-combining dichroic mirror DM42.

In other words, the liquid crystal projector of this embodiment, like the above-described first embodiment, permits the first color-combining dichroic mirror DM41 to combine the green image light Ga with image light of one of the other colors, and permits the second color-combining dichroic mirror DM42 to combine the combined image light containing a green component acquired by the first color-combining dichroic mirror DM41 with image light of the other color, with the characteristics of the first and second color-combining dichroic mirrors DM41 and DM42 made opposite to those of the first embodiment to thereby reflect the green image light Ga and pass the red and blue image lights Ra and Ba.

Figure 16:
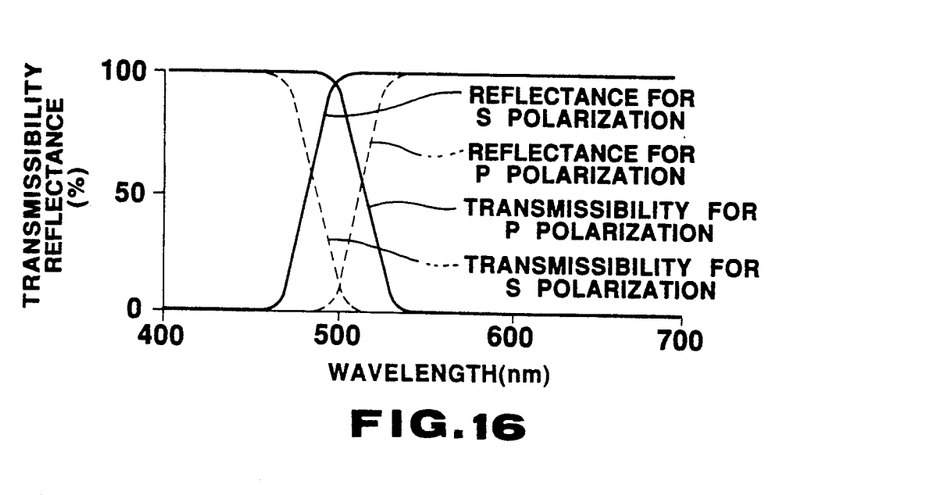
FIG. 16 is a diagram showing the spectral characteristic of a first color-combining dichroic mirror of the liquid crystal projector according to the third embodiment.
Figure 17:
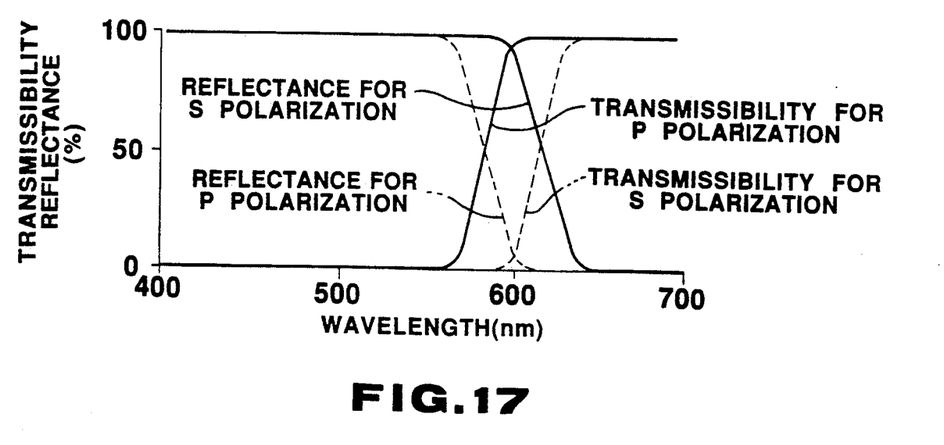
FIG. 17 is a diagram showing the spectral characteristic of a second color-combining dichroic mirror of the liquid crystal projector according to the third embodiment.

FIG. 16 illustrates the spectral characteristic of the first color-combining dichroic mirror DM41, and FIG. 17 the spectral characteristic of the second color-combining dichroic mirror DM42. In this embodiment, the spectral characteristic of the first color-combining dichroic mirror DM41 is such that the transmission waveband and the reflection waveband are opposite to those of the spectral characteristic (as shown in FIG. 7) of the second color-combining dichroic mirror DM22 used in the first embodiment, while the spectral characteristic of the second color-combining dichroic mirror DM42 is such that the transmission waveband and the reflection waveband are opposite to those of the spectral characteristic (as shown in FIG. 6) of the first color-combining dichroic mirror DM21 used in the first embodiment.

The second color-combining dichroic mirror DM32 is given a characteristic to pass green image light Ga and reflect image light RaBa originating from the combination of red and blue lights.

In this embodiment, although the first and second color-combining dichroic mirrors DM41 and DM42 are given characteristics to reflect the green image light Ga and pass the red and blue image lights Ra and Ba, the directions of polarization of the individual image lights Ra, Ga and Ba are opposite to those in the first embodiment so that the green image light Ga is made to be incident as S-polarized light to the first and second color-combining dichroic mirrors DM41 and DM42 while the red image light Ra and blue image light Ba are made to be incident as P-polarized lights to those dichroic mirrors DM41 and DM42. Like in the first embodiment, therefore, it is possible to make the transmission wavebands and reflection wavebands of the color-combining dichroic mirrors DM41 and DM42 sufficiently wider to the waveband of incident light.

The liquid crystal projector of this embodiment can also permit the dichroic mirrors DM41 and DM42 to pass or reflect light of every wavelength of the image lights Ra, Ga and Ba incident to the dichroic mirrors DM41 and DM42 without narrowing the wavebands of image lights from individual display elements 10R, 10G and 10B, thereby providing full-color image light RaGaBa with well-balanced colors.

Figure 15A:
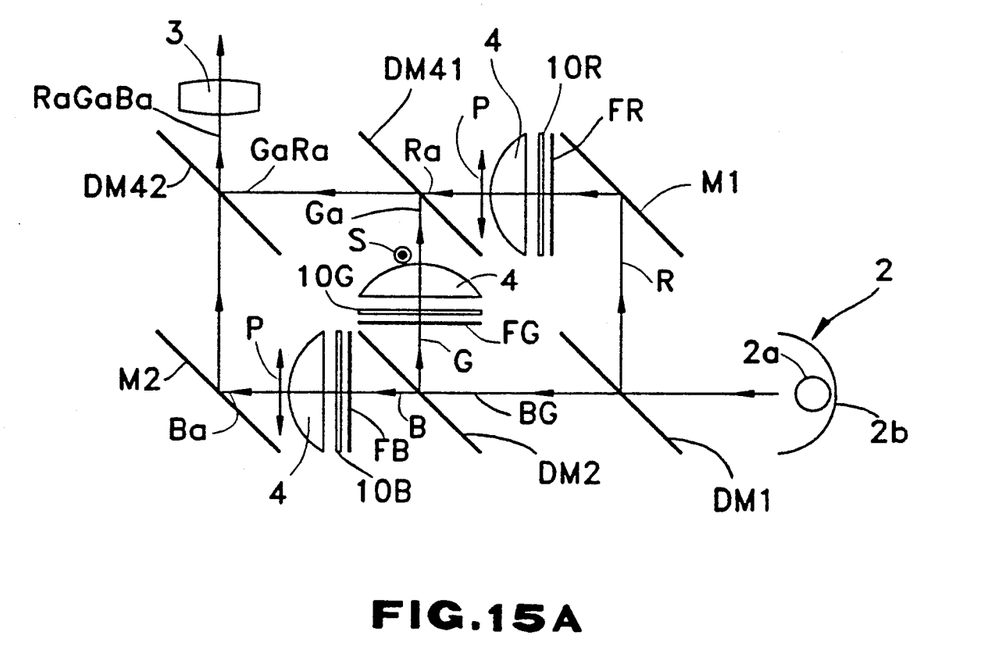
FIG. 15A shows a modification of the third embodiment.

Although the green image light Ga and the blue image light Ba are combined first to yield image light GaBa and then this combined image light GaBa is combined with the red image light Ra to provide full-color image light RaGaBa in this embodiment, the order of combining the image lights is not restricted to this particular order. For instance, the green image light and red image light may be combined first and the resultant image light may then be combined with the blue image light. In this case as shown in FIG. 15A, the location of the red image display element 10R should be changed with that of the blue image display element 10B, the spectral characteristic of the second color-separating dichroic mirror DM2 should be selected accordingly, the green image light and red image light need to be combined by the dichroic mirror having the spectral characteristic shown in FIG. 17 and the resultant combined image light needs to be combined with the blue image light by the dichroic mirror having the spectral characteristic shown in FIG. 16.

A fourth embodiment will now be described referring to FIGS. 18 to 20.

Figure 18:
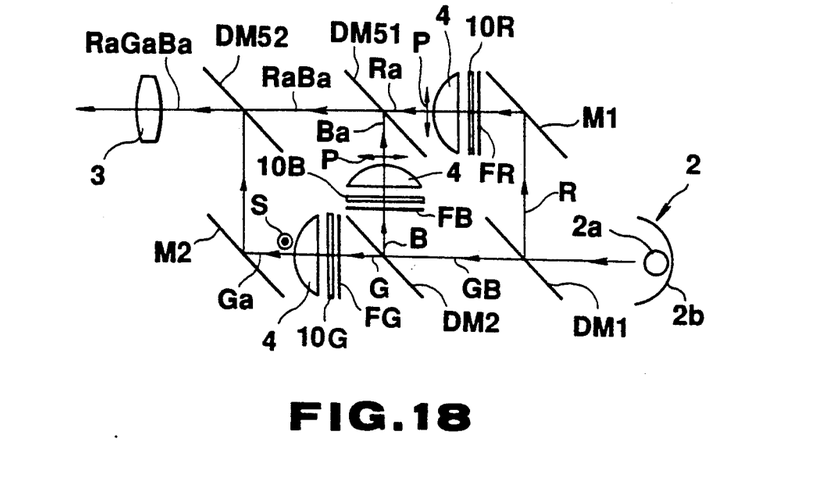
FIG. 18 is a diagram illustrating a liquid crystal projector according to a fourth embodiment.

FIG. 18 illustrates the structure of a liquid crystal projector according to this embodiment. This liquid crystal projector, like the second embodiment, is designed in such a way that an optical system for combining red, green and blue image lights Ra, Ga and Ba comprises a first color-combining dichroic mirror DM51 for combining the red image light Ra from the red image display element 10R with blue image light Ba from the blue image display element 10B to yield magenta image light RaBa and a second color-combining dichroic mirror DM52 for combining the image light RaBa with green image light Ga from the green image display element 10G. Components in FIG. 18 which correspond or are identical to those shown in FIG. 12 are denoted by like or same reference numerals to avoid their repetitive description.

In this embodiment, the first color-combining dichroic mirror DM51 is given the same spectral characteristic as that of the first color-combining dichroic mirror DM31 used in the second embodiment, while the second color-combining dichroic mirror DM52 is given a spectral characteristic to reflect the green image light Ga and pass the image light RaBa (red and blue lights combined) acquired by the first color-combining dichroic mirror 51, and the transmission axis of the light-leaving polarizing plate 19 of the green image display element 10G extends in the direction to be S-polarization to the second color-combining dichroic mirror DM42 while the transmission axes of the light-leaving polarizing plates 19 of the red and blue image display elements 10R and 10B extend in the direction to be P-polarization to the second color-combining dichroic mirror DM42.

In other words, the liquid crystal projector of this embodiment, like the above-described second embodiment, permits the first color-combining dichroic mirror DM51 to combine the red and blue image lights Ra and Ba and permits the second color-combining dichroic mirror DM52 to combine the combined magenta image light RaBa acquired by the first color-combining dichroic mirror DM51 with the green image light Ga to provide fullcolor image light RaGaBa, with the characteristic of the second color-combining dichroic mirror DM52 made opposite to that of the first embodiment to thereby reflect the green image light Ga and pass the red and blue image lights Ra and Ba.

Figure 19:
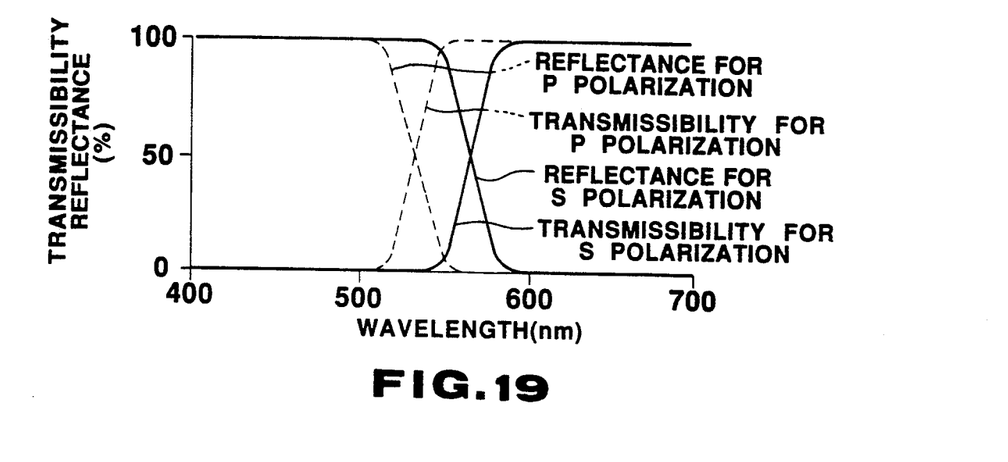
FIG. 19 is a diagram showing the spectral characteristic of a first color-combining dichroic mirror of the liquid crystal projector according to the fourth embodiment.
Figure 20:
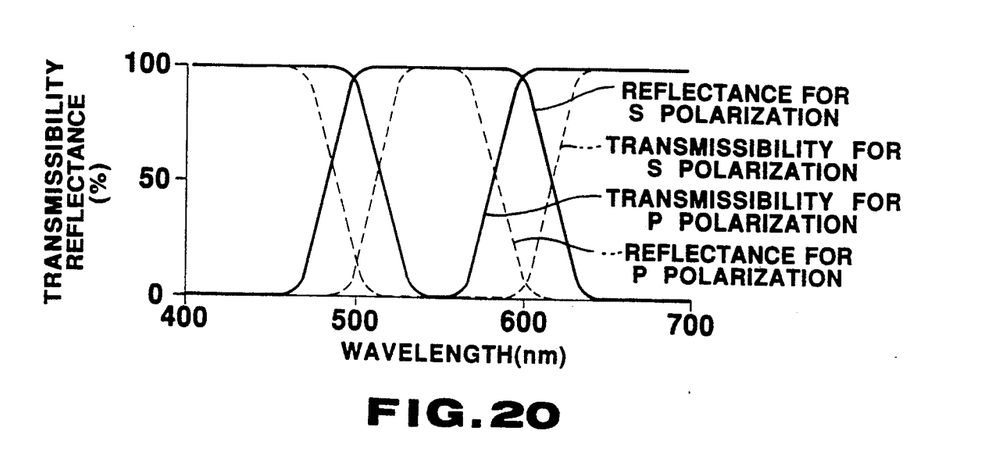
FIG. 20 is a diagram showing the spectral characteristic of a second color-combining dichroic mirror of the liquid crystal projector according to the fourth embodiment.

FIG. 19 illustrates the spectral characteristic of the first color-combining dichroic mirror DM51, and FIG. 20 the spectral characteristic of the second color-combining dichroic mirror DM52. In this embodiment, the first color-combining dichroic mirror DM51 is given the same spectral characteristic as that (shown in FIG. 13) of the first color-combining dichroic mirror DM31 used in the second embodiment and the second color-combining dichroic mirror DM52 is given a characteristic in which the transmission waveband and reflection waveband are opposite to those of the spectral characteristic (shown in FIG. 14) of the second color-combining dichroic mirror DM32 used in the second embodiment.

In this embodiment, although the second color-combining dichroic mirror DM52 is given a characteristic to reflect the green image light Ga and pass the red and blue image lights Ra and Ba, the directions of polarization of the individual image lights Ra, Ga and Ba are opposite to those in the second embodiment so that the green image light Ga is made to be incident as S-polarized light to the second color-combining dichroic mirror DM52 while the red image light Ra and blue image light Ba are made to be incident as P-polarized lights to the dichroic mirror DM52. Like in the second embodiment, therefore, it is possible to make the transmission wavebands and reflection wavebands of the second color-combining dichroic mirror DM52 sufficiently wider to the waveband of incident light.

Although the red image light Ra and the blue image light Ba to be combined by the first color-combining dichroic mirror DM51 are P-polarized lights, since the waveband of this red image light Ra is separated from that of the blue image light Ba by the waveband of the green light, light of every wavelength of the red image light Ra and the blue image light Ba to be incident to the first color-combining dichroic mirror DM51 can pass through the dichroic mirror DM51 irrespective of the shifting of the spectral characteristic of the dichroic mirror DM51 due to a change in the direction of polarization of incident light or a change in the incident angle.

The liquid crystal projector according to this embodiment can also permit the second color-combining dichroic mirror DM52 to pass or reflect light of every wavelength of the image lights Ra, Ga and Ba incident to this dichroic mirror DM52 to provide full-color image light with good color balance without narrowing the wavebands of the image lights Ra, Ga and Ba from the individual display elements 10R, 10G and 10B, thereby ensuring projection of high-quality full-color image light with high brightness and free of color irregularity.

In the above embodiment, the location of the red image display element 10R may be changed with the location of the blue image display element 10B. In this case, the spectral characteristics of the first and second color-separating dichroic mirrors DM1 and DM2 should be selected in accordance with the arrangement of the individual display elements 10R, 10G and 10B, and the spectral first color-combining dichroic mirror DM51 should have a characteristic to reflect the red image light Ra and pass the blue image light Ba. In this case too, the second color-combining dichroic mirror DM52 can have the same characteristic as that in the above embodiment.

Although light from a single light source 2 is separated into red, green and blue lights R, G and B by the color-separating dichroic mirrors DM1 and DM2 and the individual lights R, G and B enter the respective display elements 10R, 10G and 10B in the above-described first to fourth embodiments, the light source may be provided for each display element 10R, 10G or 10B. In this case, the red, green and blue lights may be sent from the respective light sources to the respective display elements, or the individual display elements may be provided with red, green and blue color filters so that white lights from the individual light sources can be sent via the filters to the display elements.

While the color purity compensation filters FR, FG and FB are provided on the light-incident sides of the respective display elements 10R, 10G and 10B in the first to fourth embodiments, the compensation filters should not necessarily be provided.

Further, the luminous flux reduction lenses 4 are arranged on the light-leaving sides of the individual display elements 10R, 10G and 10B in FIGS. 4, 15 and 18, those lenses 4 may be provided on the light-incident sides of the display elements 10R, 10G and 10B.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal projector comprising:
a light source;
light separating means for separating light from said light source into lights of red, green and blue wavebands;
a plurality of liquid crystal display panels for producing image lights of red, green and blue wavebands using said separated lights of red, green and blue wavebands;
light combining means for combining said image lights of red, green and blue wavebands, said light combining means comprising:
a first dichroic mirror for passing said blue image light incident as P-polarized light and reflecting said green image light incident as S-polarized light to thereby combine said blue image light with said green image light, and
a second dichroic mirror for passing said red image light incident as P-polarized light and reflecting said image light containing said green image light of S-polarization combined by said first dichroic mirror to thereby combine said red image light with said image light combined by said first dichroic mirror;
a luminous flux reduction lens provided on an optical path running from said light separating means to said light combining means; and
projecting means for projecting said image light combined by said light combining means.

2. A liquid crystal projector comprising:
a light source;
light separating means for separating light from said light source into lights of red, green and blue wavebands;
a plurality of liquid crystal display panels for producing image lights of red, green and blue wavebands using said separated lights of red, green and blue wavebands;
light combining means for combining said image lights of red, green and blue wavebands, said light combining means comprising:
a first dichroic mirror for passing said red image light incident as P-polarized light and reflecting said green image light incident, as S-polarized light to thereby combine said red image light with said green image light, and
a second dichroic mirror for passing said blue image light incident as P-polarized light and reflecting said image light containing said green image light of S-polarization combined by said first dichroic mirror to thereby combine said blue image light with said image light combined by said first dichroic mirror;
a luminous flux reduction lens provided on an optical path running from said light separating means to said light combining means; and
projecting means for projecting said image light combined by said light combining means.

3. A liquid crystal projector comprising:
a light source;
light separating means for separating light from said light source into lights of red, green and blue wavebands;
a plurality of liquid crystal display panels for producing image lights of red, green and blue wavebands using said separated lights of red, green and blue wavebands;
light combining means for combining said image lights of red, green and blue wavebands, said light combining means comprising:
a first dichroic mirror for passing said red image light incident as P-polarized light and reflecting said blue image light incident as P-polarized light to thereby combine said red image light with said blue image light, and
a second dichroic mirror for reflecting said green image light incident as S-polarized light and passing said image light combined by said first dichroic mirror to thereby combine said green image light with said image light combined by said first dichroic mirror;
a luminous flux reduction lens provided on an optical path running from said light separating means to said light combining means; and
projecting means for projecting said image light combined by said light combining means.

4. A liquid crystal projector comprising:
a light source including a high-luminance light emitting element and a reflector for converting light from said light emitting element into parallel light beams;
light separating means for separating light from said light source into lights of three different wavebands;
three liquid crystal display elements for producing image lights of three different wavebands using said separated lights of three different wavebands;
light combining means including a plurality of dichroic mirrors for combining said image lights of three different wavebands to finally provide a single image light including image lights of three different wavebands in balance, at least one of said plurality of dichroic mirrors allowing a wider intermediate waveband of a polarizing direction to be emitted from a surface thereof;

a luminous flux reduction lens provided on an optical path running from said light separating means to said light combining means; and projecting means for projecting said image light combining by said light combining means, wherein each of said plurality of dichroic mirrors has a reflection/transmission characteristic which differ in accordance with a change in incident angle of light thereon.

5. A liquid crystal projector according to claim 4, wherein said luminous flux reduction lens is provided on an image light-leaving side of said three liquid crystal display elements.

6. A liquid crystal projector according to claim 4, wherein said lights of three different wavebands are light with a wavelength equal to or less than approximately 500 nm, light with a wavelength between approximately 500 nm to approximately 600 nm, and light with a wavelength equal to or greater than approximately 600 nm.

7. A liquid crystal projector according to claim 4, wherein the dichroic mirrors of said light combining means reflect image light of an intermediate waveband to combine it with image light of other wavebands to provide said single image light, when image light of an intermediate waveband is an S-polarized light.

8. A liquid crystal projector according to claim 4, wherein the dichroic mirrors of said light combining means transmit image light of an intermediate waveband to combine it with image light of other wavebands to provide said single image light, when image light of an intermediate waveband is an S-polarized light.

* * * * *